US011643209B1

(12) United States Patent
Kiser

(10) Patent No.: US 11,643,209 B1
(45) Date of Patent: May 9, 2023

(54) AIRCRAFT LOADING SYSTEM

(71) Applicant: Government of the United States, as represented by the Secretary of the Air Force, Wright-Patterson AFB, OH (US)

(72) Inventor: Brett Kiser, Honolulu, HI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 310 days.

(21) Appl. No.: 17/034,332

(22) Filed: Sep. 28, 2020

Related U.S. Application Data

(60) Provisional application No. 62/907,879, filed on Sep. 30, 2019.

(51) Int. Cl.
*B64D 9/00* (2006.01)
*B60P 7/08* (2006.01)

(52) U.S. Cl.
CPC ............ *B64D 9/003* (2013.01); *B60P 7/0807* (2013.01)

(58) Field of Classification Search
CPC .......... B64D 9/003; B64D 9/00; B60P 7/0807
See application file for complete search history.

(56) References Cited

U.S. PATENT DOCUMENTS

| | | | | |
|---|---|---|---|---|
| 3,698,678 A | * | 10/1972 | Bowers | F16B 45/00 410/105 |
| 5,490,703 A | * | 2/1996 | Hewko | A61G 1/0293 244/118.6 |
| 6,622,640 B2 | * | 9/2003 | Taylor | B65D 90/0013 108/55.5 |
| 7,214,015 B2 | * | 5/2007 | Bruns | B60P 7/0815 410/102 |
| 9,452,667 B2 | * | 9/2016 | Harmon | B64D 1/22 |
| 9,669,928 B2 | * | 6/2017 | Eilken | B64D 9/00 |

FOREIGN PATENT DOCUMENTS

DE 202014010190 U1 * 5/2016

OTHER PUBLICATIONS

C-5's technical data illustrations of the aircraft's "A-Frame". Related to current K-Frame invention for C-17.

* cited by examiner

*Primary Examiner* — Richard Green
*Assistant Examiner* — Madison Elizabeth Dittner
(74) *Attorney, Agent, or Firm* — AFMCLO/JAZ; Jeffrey R Moore

(57) ABSTRACT

An aircraft loading system is configured to tether equipment within an aircraft. The loading system has a wedge shaped bracket that has a front plate joined to two side plates and a bottom plate. A middle plate is parallel to the front plate and joins the two side plates. A front opening is arranged through the bottom plate between the front plate and the middle plate. The front opening is configured to accommodate an attachment ring. The attachment ring is used to tether the equipment within the aircraft.

3 Claims, 3 Drawing Sheets

AIRCRAFT LOADING SYSTEM

Pursuant to 37 C.F.R. § 1.78(a)(4), this application claims the benefit of and priority to prior filed Provisional Application Ser. No. 62/907,879, filed Sep. 30, 2019, which is expressly incorporated herein by reference.

RIGHTS OF THE GOVERNMENT

The invention described herein may be manufactured and used by or for the Government of the United States for all governmental purposes without the payment of any royalty.

FIELD OF THE DISCLOSURE

The invention provides simplified cargo securing on a C-17 Cargo plane and is compatible with both standard military connectors and aircraft hardware.

BACKGROUND

A loading system is configured to tether equipment within an aircraft. The loading system has a wedge shaped bracket that has a front plate joined to two side plates and a bottom plate. A middle plate is parallel to the front plate and joins the two side plates. A front opening is arranged through the bottom plate between the front plate and the middle plate. The front opening is configured to accommodate an attachment ring. The attachment ring is used to tether the equipment within the aircraft.

Old methods/techniques do not adequately address these problems because lack of alignment during rush (combat) operations can lead to misaligned loading and damage to the aircraft. Lack of proper lateral load tie-downs can lead to plane instability. Minor imbalances can consume excessive fuel use. Larger imbalances may be an aircraft safety issues.

SUMMARY OF THE INVENTION

The present disclosure relates to an aircraft loading system is configured to tether equipment within an aircraft.

The aircraft loading system is configured to tether equipment within an aircraft to an aircraft floor having an attachment ring; the loading system comprising a wedged bracket that includes a front plate joined to a first angled side plate and a second angled side plate; all secured to a bottom plate 30 having a bottom slot 33, a ring plate 40, the ring plate having a ring plate slot 41 wherein the attachment ring extends through the bottom slot and attached to a tension/securing device and the wedge bracket is wedged within the aircraft floor. The loading system wedge bracket may include at least one reinforcement plate. The wedge bracket may include at least one linear side plate to protect the aircraft floor and further guide the placement of equipment on the aircraft floor.

The Aircraft loading system may include a wedge shaped bracket that has a front plate joined to two side plates and a bottom plate. A middle plate is parallel to the front plate and joins the two side plates. A front opening is arranged through the bottom plate between the front plate and the middle plate. The front opening is configured to accommodate an attachment ring. The attachment ring is used to tether the equipment within the aircraft.

While the invention may be described in connection with certain embodiments, it may be understood that the invention is not limited to these embodiments. To the contrary, this invention includes all alternatives, modifications, and equivalents as may be included within the spirit and scope of the present invention.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Figure 1:
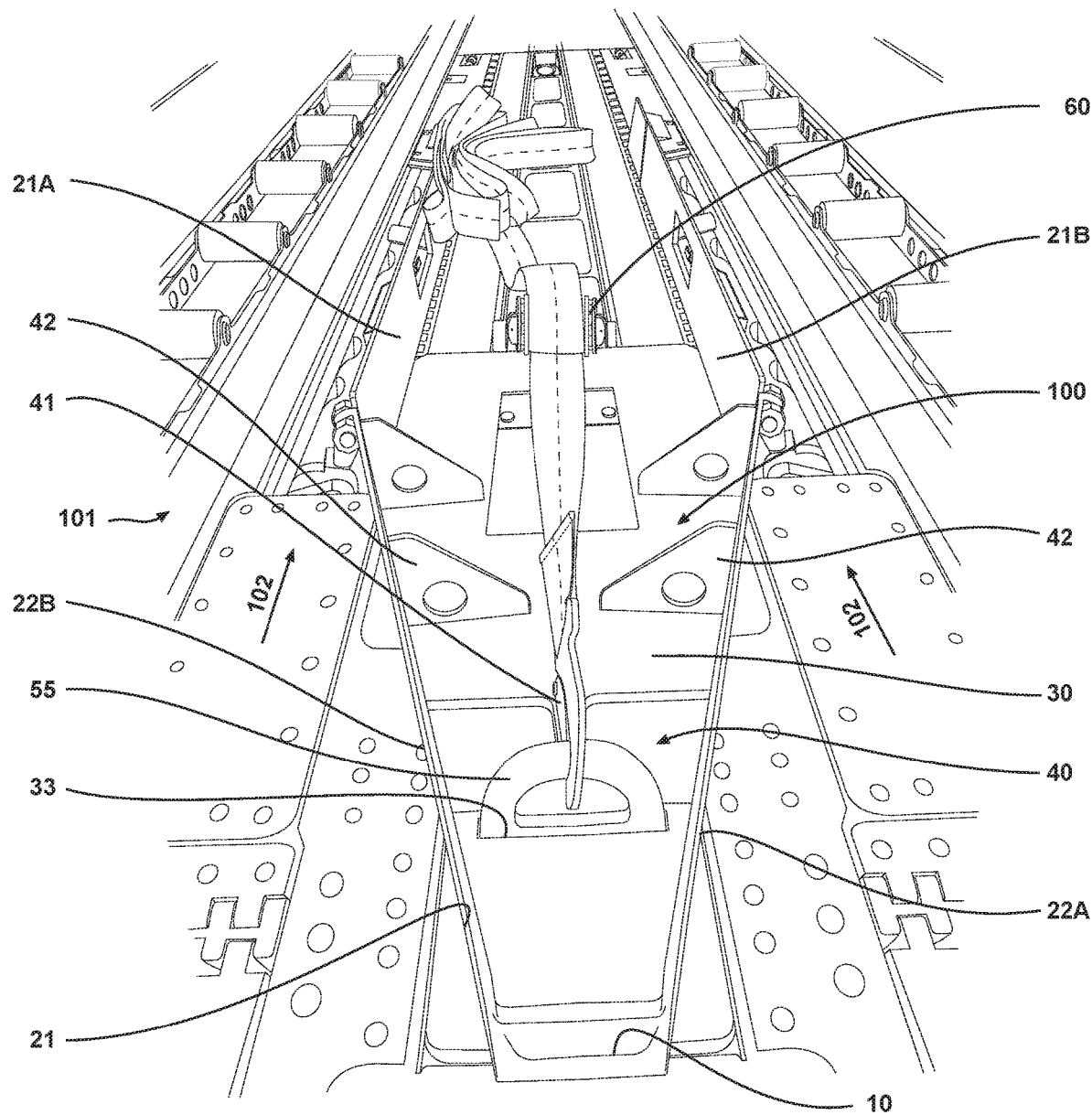
FIG. 1 is an illustration of one view of the present invention.

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

By way of example, one embodiment of a loading system is configured to tether equipment within an aircraft. The loading system has a wedge shaped bracket that has a front plate joined to two side plates and a bottom plate. A middle plate is parallel to the front plate and joins the two side plates. A front opening is arranged through the bottom plate between the front plate and the middle plate. The front opening is configured to accommodate an attachment ring.

The bracket can be fabricated from of steel or another hardened material. One can cut steel pieces and weld them together. The cut out of the ring slot secures the wedge to the aircraft floor using a tension/securing device and aircraft ring. The guide rails that form a "V" type shape is necessary to act as a guide for incoming air cargo pallets. The design can be changed to take out the "V" shape. The material can be changed to hardened plastic or another material.

To use the device, when a C-17 is configured for cargo loading operations with the logistic rails in the upward position, someone can place the bracket at the very aft end of the middle logistic rails system. Lifting the farthest aft middle ring in the upward position, slide the ring into the designated and only ring slot with the bracket lying flat on the floor. The ring can be held in the up position as designed. Doing this step will mean the bracket is place appropriately (the "V" shape of the design will face toward the back of the aircraft). Using a cargo strap, secure the hook onto the ring that is sticking out of the bracket and take the ratchet to the next farthest ring toward the front of the aircraft. Ratchet the strap until tension is applied which would secure the bracket to the aircraft floor. Doing so will provide protection to the aircraft logistic rail system, acting as a guide for aircraft cargo pallets and preventing damage to the middle logistic rail system.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

For convenience, like elements have like reference numbers in the following referenced drawings.

FIG. 1 is an illustration of a loading system using a wedge bracket 100. The wedge bracket 100 includes which includes a front plate 10 joined to a first angled side plate 22A and a second angled side plate 21B, all of which are joined to a bottom plate 30 having a bottom slot 33 sized to fit an aircraft load attachment ring 55 which is integral to the aircraft floor 100. The attachment ring 55 is used to tether equipment and supplies within the aircraft. The wedge bracket may further include a ring plate 40 having a ring plate slot 41. The ring plate 40 and ring plate slot 41 guide, center and reinforce the attachment of cargo pallets (not shown) to the aircraft floor 101 securely with reinforced material for the ring 55 and proper centered guidance of a tension/securing device 60. The tension securing device 60 may be any device known in the art and in one embodiment as shown, a hook and strap tiedown. Optionally, the wedge bracket may include reinforcement plate(s) 42 as needed, depending upon the wedge material and load requirements.

In one embodiment the wedge bracket assists in the alignment of pallet loading onto the aircraft floor 101 in a direction 102.

In one embodiment the wedge bracket 100 may include a first linear side plate 22A and a second linear side plate 22B. The linear side plates may be used to further protect the aircraft floor 101 from damage from shifting pallets and/or provide extended guidance as multiple pallets are loaded onto the aircraft floor 101.

Figure 2:
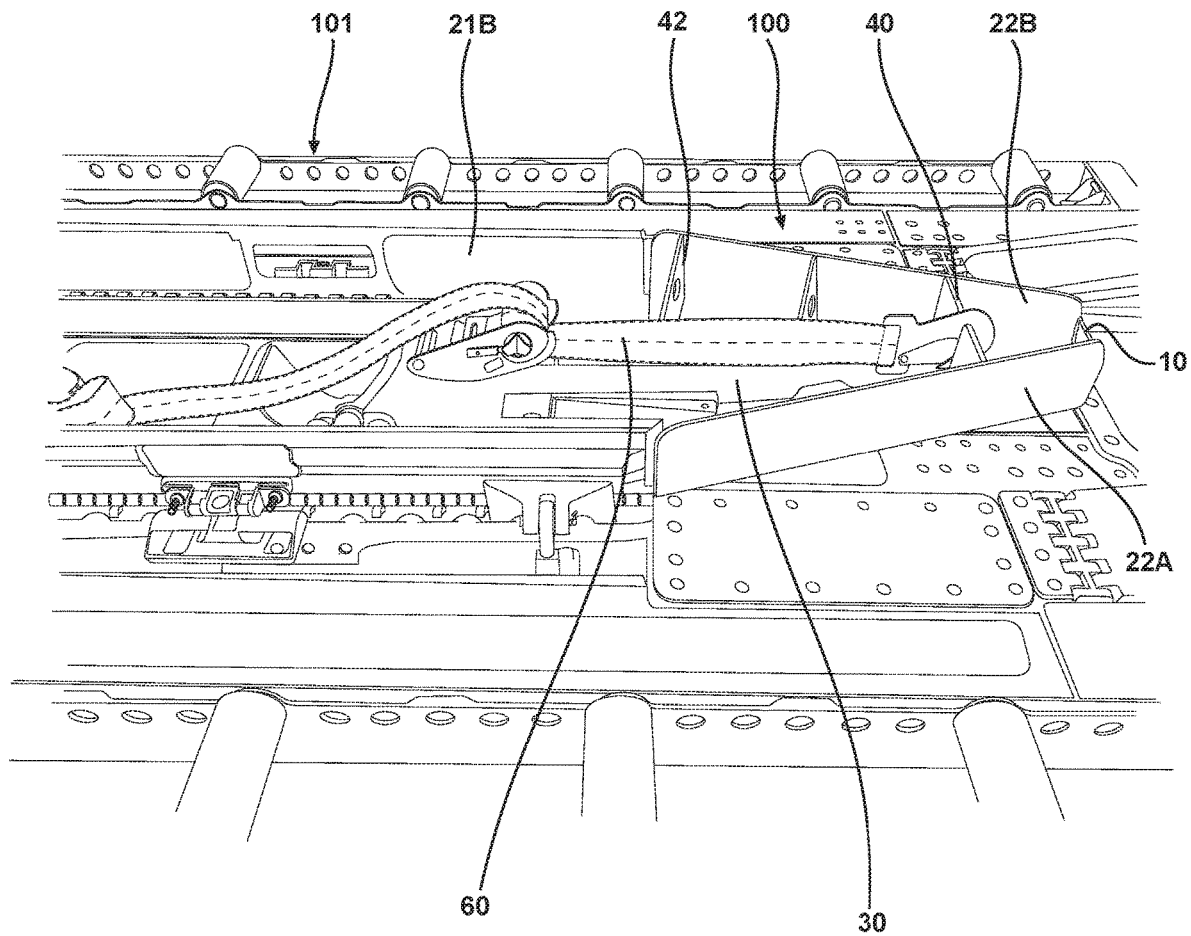
FIG. 2 is an illustration of one view of the present invention.

FIG. 2 is an alternate illustration of the loading system using the wedge bracket 100. A side view of the wedge bracket 100 further illustrates the front plate 10 joined to a first angled side plate 22A and the second angled side plate 22B, all of which are joined to the bottom plate 30 which has the bottom slot 33 sized to fit an aircraft load attachment ring 55 (which is integral to the aircraft floor 10) and allow the ring 55 to sit up vertically from the floor, as opposed to its horizontal stowed state. The attachment ring 55 is used to tether equipment and supplies within the aircraft. The wedge bracket may further include the ring plate 40 which includes the ring plate slot 41. The ring plate 40 and ring plate slot 41 guide, center and reinforce the attachment of cargo pallets (not shown) to the aircraft floor 101 securely with reinforced material for the ring 55 and proper centered guidance of the tension/securing device 60. The tension securing device 60 may be any device known in the art and in one embodiment as shown, a hook and strap tiedown. Optionally, the wedge bracket may include the reinforcement plate(s) 42 as needed, depending upon the wedge material and load requirements.

Figure 3:
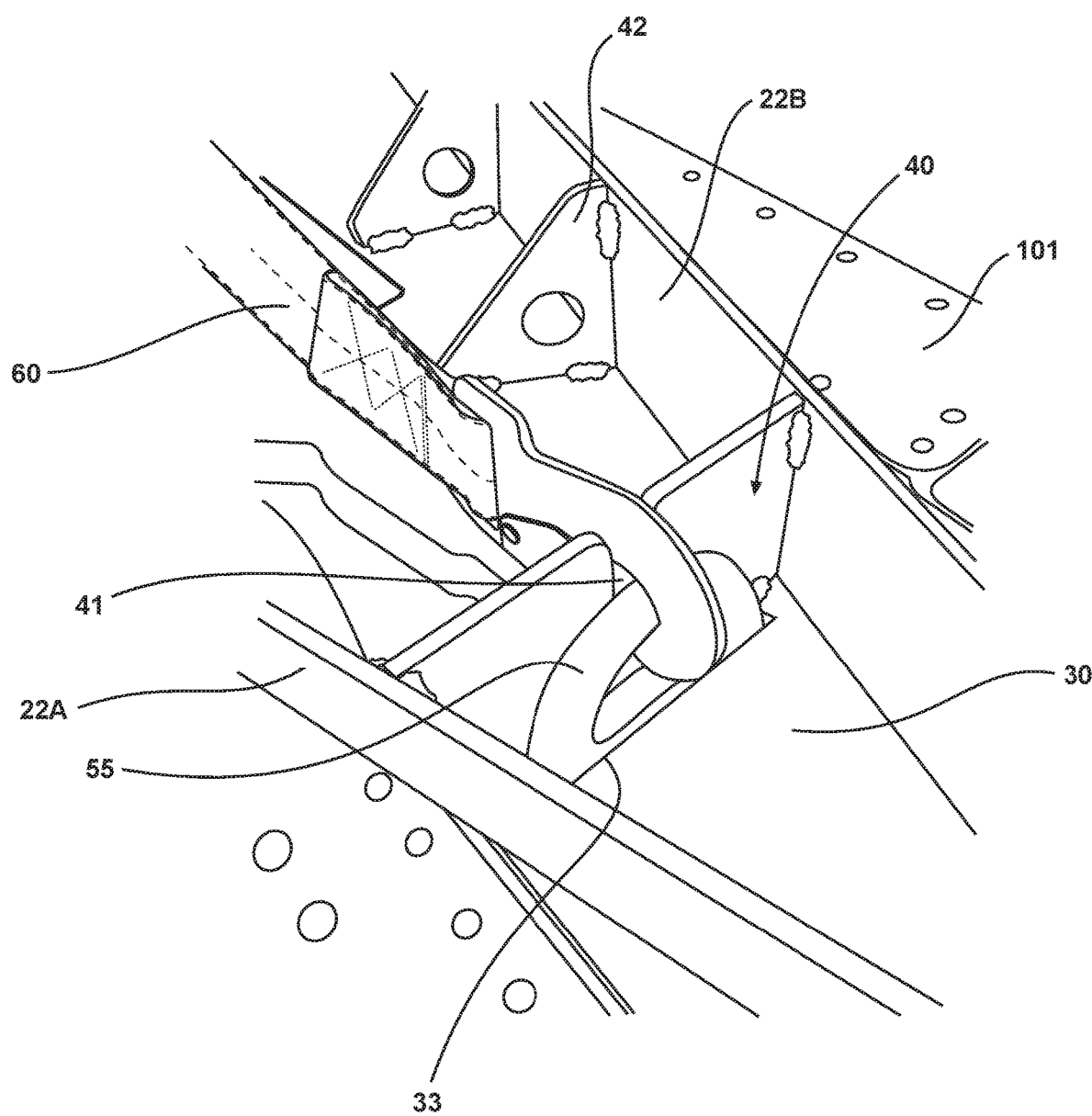
FIG. 3 is an illustration of one view of the present invention.

FIG. 3 is a close up illustration of a portion of the wedge bracket 100 illustrating the first angled side plate 22A and the second angled side plate 22B, all of which are joined to the bottom plate 30 which has the bottom slot 33 sized to fit an aircraft load attachment ring 55 (which is integral to the aircraft floor 10) and allow the attachment ring 55 to sit up vertically from the floor, as opposed to its horizontal stowed state. The attachment ring 55 is used to tether equipment and supplies within the aircraft. The wedge bracket may further include the ring plate 40 which includes the ring plate slot 41. The ring plate 40 and ring plate slot 41 guide, center and reinforce the attachment of cargo pallets (not shown) to the aircraft floor 101 securely with reinforced material for the ring 55 and proper centered guidance of the tension/securing device 60. The tension securing device 60 may be any device known in the art and in one embodiment as shown, a hook and strap tie-down. Optionally, the wedge bracket may include the reinforcement plate(s) 42 as needed, depending upon the wedge material and load requirements.

While the present invention has been illustrated by a description of one or more embodiments thereof and while these embodiments have been described in considerable detail, they are not intended to restrict or in any way limit the scope of the appended claims to such detail. Additional advantages and modifications may readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A loading system within an aircraft configured to tether equipment comprising:
    an aircraft floor having an attachment ring
    a wedged bracket that includes:
        a front plate joined to;
        a first angled side plate and a second angled side plate;
        the first angled side plate, second angled side plate and front plate forming the wedge bracket in a wedge shape secured to;
        a bottom plate having a bottom slot, a ring plate, the ring plate having a ring plate slot wherein the attachment ring extends through the bottom slot and attached to a tension/securing device and the wedge bracket guides, centers and reinforce the attachment of the equipment on the aircraft floor.

2. The loading system of claim 1 wherein the wedge bracket includes at least one reinforcement plate.

3. The loading system of claim 1 wherein the wedge bracket includes at least one linear side plate to protect the aircraft floor and further guide the placement of equipment on the aircraft floor.

* * * * *